US011275913B2

(12) United States Patent
    Astvatsaturov (10) Patent No.: US 11,275,913 B2
(45) Date of Patent: Mar. 15, 2022

(54) AIM LIGHT ASSEMBLIES FOR USE IN BARCODE READERS AND METHODS AND SYSTEMS ASSOCIATED THEREWITH

(71) Applicant: ZEBRA TECHNOLOGIES CORPORATION, Lincolnshire, IL (US)

(72) Inventor: Yuri Astvatsaturov, Lake Forest, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 79 days.

(21) Appl. No.: 16/698,037

(22) Filed: Nov. 27, 2019

(65) Prior Publication Data

US 2021/0157994 A1    May 27, 2021

(51) Int. Cl.
    *G06K 7/10*    (2006.01)
    *G06K 7/14*    (2006.01)

(52) U.S. Cl.
    CPC ....... *G06K 7/10564* (2013.01); *G06K 7/1413* (2013.01)

(58) Field of Classification Search
    CPC ........... G06K 7/10831; G06K 7/10742; G06K 7/10881; G06K 7/10722
    USPC ............................ 235/462.2, 462.45, 472.01
    See application file for complete search history.

(56) References Cited

U.S. PATENT DOCUMENTS

| | | | |
|---|---|---|---|
| 6,122,256 A * | 9/2000 | Berglund | H04L 12/1868 370/241 |
| 6,267,294 B1 * | 7/2001 | Stern | G06K 7/10722 235/462.41 |
| 8,113,430 B2 * | 2/2012 | Oliva | G06K 9/2036 235/462.35 |
| 8,517,272 B1 * | 8/2013 | Evans | G06K 7/10722 235/462.42 |
| 9,639,728 B1 * | 5/2017 | Handshaw | G06K 7/10722 |
| 10,133,897 B1 * | 11/2018 | Bassani | G02B 19/0014 |
| 10,515,244 B2 * | 12/2019 | Drzymala | G06K 7/10801 |
| 2008/0142600 A1 * | 6/2008 | Joseph | G06K 7/10732 235/462.42 |

OTHER PUBLICATIONS

International Search Report and Written Opinion for International Application No. PCT/US2020/052120 dated Oct. 19, 2020.

* cited by examiner

*Primary Examiner* — Daniel St. Cyr
(74) *Attorney, Agent, or Firm* — Yuri Astvatsaturov (57) ABSTRACT

A method and apparatus for manipulating an aiming light of a reader to indicate the field-of-view (FOV) of an imager within the reader includes a window and an optical element. The FOV of the imager extends through the window. The optical element receives the aiming light from an aiming assembly and redirect the aiming light such that the central axis of the aiming light exiting the optical element is non-coaxial with the central aiming axis of the aiming assembly at the entry of the optical element. The optical element may be configured to project an image on a target that indicates the boundary of the FOV or project an image on the target that indicates the center of the FOV.

24 Claims, 12 Drawing Sheets

AIM LIGHT ASSEMBLIES FOR USE IN BARCODE READERS AND METHODS AND SYSTEMS ASSOCIATED THEREWITH

BACKGROUND

Barcode readers are commonly used throughout various industries and in a wide array of environments to read barcodes. In certain examples, these barcode readers include an aiming assembly that is designed to project an aim patterns into the field of view (FOV) of the barcode reader and indicate to the user some positional aspect of the reader's FOV. However, due to the inherent positioning of the aiming assembly away from the imaging elements of the barcode reader that are responsible for the FOV and/or parallax that effects the position of the aim pattern on a target as that target moves away or comes closer to the barcode's imager, achieving accurate representation of certain elements of the FOV across the working range of a barcode reader becomes problematic.

Accordingly, there is a need for improved techniques of providing aim light patterns that can more-accurately indicate various elements of an imaging assembly's FOV throughout the working range of the imaging assembly, and devices, systems, and methods associated therewith.

SUMMARY

In an embodiment, the present invention is an apparatus that includes a housing, an imaging assembly and an aiming assembly. The housing has a cavity, a window and an optical element, with the imaging assembly and aiming assembly being disposed within the cavity. The imaging assembly has an imager with a field-of-view (FOV) extending through the window. The FOV has a central FOV axis and a boundary FOV axis non-parallel relative to the central FOV axis. The imager is configured to capture at least one of: light reflected from a target and light emitted from the target. The aiming assembly is configured to provide an aiming light through the optical element, and the optical element is configured to direct the aiming light parallel to the boundary FOV axis, such that the aiming light projects an image on the target that indicates the boundary of the FOV.

In a variation of this embodiment, the optical element is a light guide having a first surface, a second surface, an entry surface and an exit surface. The light guide is configured to receive aiming light from the aiming assembly at the entry surface and direct the aiming light parallel to the boundary FOV axis at the exit surface. In another variation of this embodiment, the entry surface is configured to direct the aiming light to the first surface, the first surface is configured to reflect the aiming light to the second surface, and the second surface is configured to reflect the aiming light to the exit surface. In a further variation of this embodiment, the light guide is configured to reflect the aiming light between the first and second surfaces at least twice before exiting the light guide at the exit surface. In yet another variation of this embodiment, at least one of the entry surface and the exit surface is at least one of a concave surface pattern and a convex surface pattern. In a yet a further variation of this embodiment, at least one of the entry surface and the exit surface is a flat surface pattern.

In still another variation of this embodiment, the window has a first portion and a second portion, the FOV extends through the first portion, and the second portion has the optical element. In a still further variation of this embodiment, the first portion comprises an interior area of the window, and the second portion comprises an area of the window peripheral to the interior area of the window. In yet another variation of this embodiment, the second portion has a plurality of regions, the optical element has a plurality of optical sub-elements each corresponding to one of the plurality of regions. In a yet further variation of this embodiment, the aiming assembly has a plurality of aiming light sources each corresponding to one of the plurality of optical sub-elements. In still another variation of this embodiment, the optical element has a light pipe extending to at least two of the plurality of sub-elements, and the aiming light assembly is configured to direct the aiming light into the light pipe.

In still another variation of this embodiment, an illumination assembly is positioned within the housing and configured to emit light through the optical element onto the target to illuminate the target for image capture.

In another embodiment, the present invention is an apparatus having a housing, an imaging assembly and an aiming assembly. The housing has a cavity, a window and an optical element, with the imaging assembly and aiming assembly being disposed within the cavity. The imaging assembly has an imager with a FOV extending through the window. The FOV has a central FOV axis and a boundary FOV axis non-parallel relative to the central FOV axis. The imager is configured to capture at least one of: light reflected from a target and light emitted from the target. The aiming assembly is configured to provide an aiming light through the optical element. The aiming light has a central aiming axis, and the optical element is configured to reposition the central aiming axis from a central source axis of a source of the aiming light to a central exit axis of an exit of the optical element. The central source axis is non-coaxial with the central exit axis.

In a variation of this embodiment, the optical element is a light guide having a first surface, a second surface, an entry surface and an exit surface. The light guide is configured to receive aiming light from the aiming assembly at the entry surface and direct the aiming light parallel to the central FOV axis at the exit surface. In another variation of this embodiment, the entry surface is configured to direct the aiming light to the first surface, the first surface is configured to reflect the aiming light to the second surface, and the second surface is configured to reflect the aiming light to the exit surface. In a further variation of this embodiment, the light guide is configured to reflect the aiming light between the first and second surfaces at least twice before exiting the light guide at the exit surface. In yet another variation of this embodiment, at least one of the entry surface and the exit surface is at least one of a concave surface pattern and a convex surface pattern. In a yet a further variation of this embodiment, at least one of the entry surface and the exit surface is a flat surface pattern.

In still another variation of this embodiment, the window has a first portion and a second portion, the FOV extends through the first portion, and the second portion has the optical element. In a still further variation of this embodiment, the first portion comprises an interior area of the window, and the second portion comprises an area of the window peripheral to the interior area of the window. In yet another variation of this embodiment, the second portion has a plurality of regions, the optical element has a plurality of optical sub-elements each corresponding to one of the plurality of regions. In a yet further variation of this embodiment, the aiming assembly has a plurality of aiming light sources each corresponding to one of the plurality of optical sub-elements. In still another variation of this embodiment, the optical element has a light pipe extending to at least two of the plurality of sub-elements, and the aiming light assembly is configured to direct the aiming light into the light pipe.

In still another variation of this embodiment, an illumination assembly is positioned within the housing and configured to emit light through the optical element onto the target to illuminate the target for image capture.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
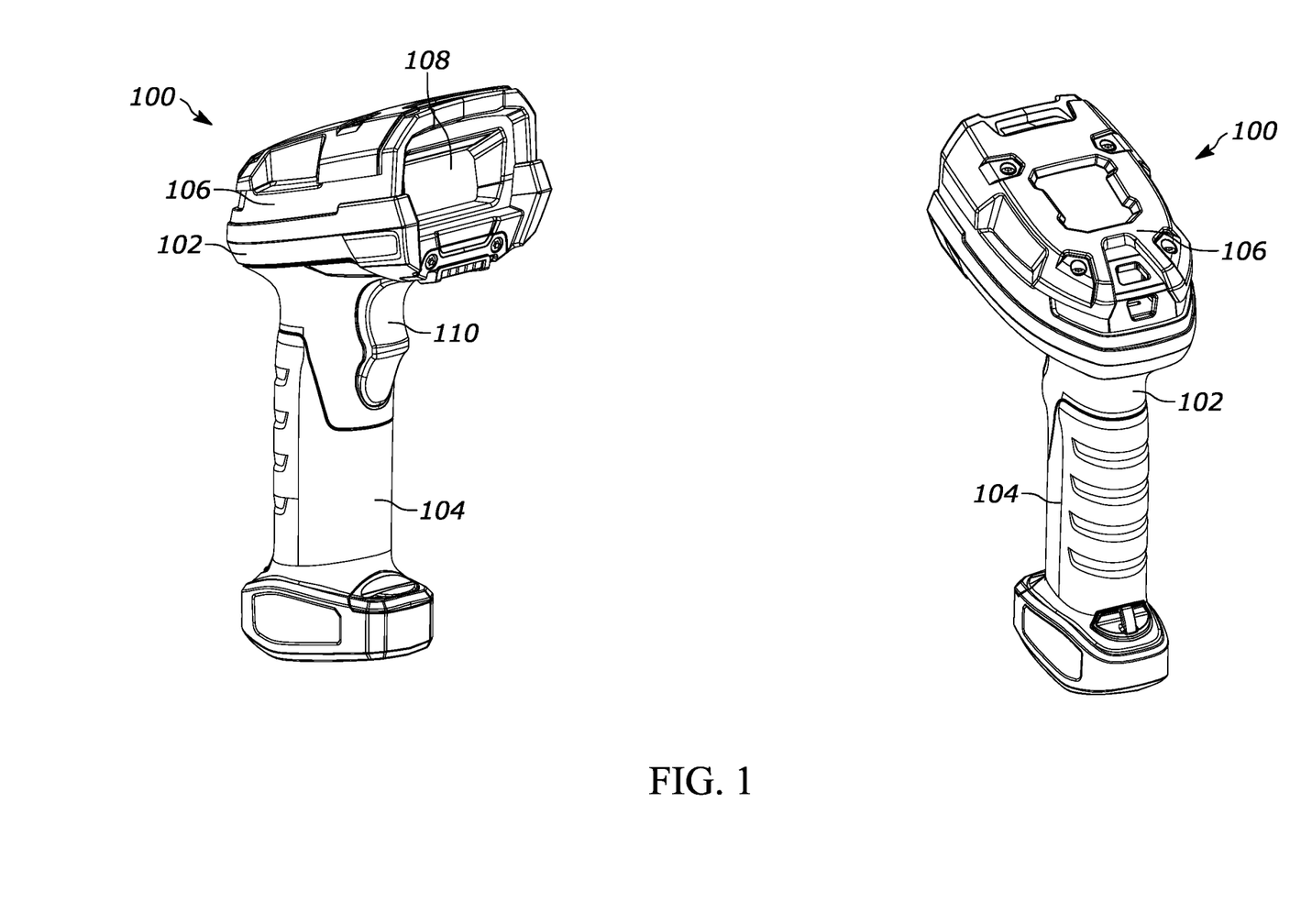
FIG. 1 illustrates a perspective front and back view of an optical imaging reader in accordance with an embodiment.
Figure 2:
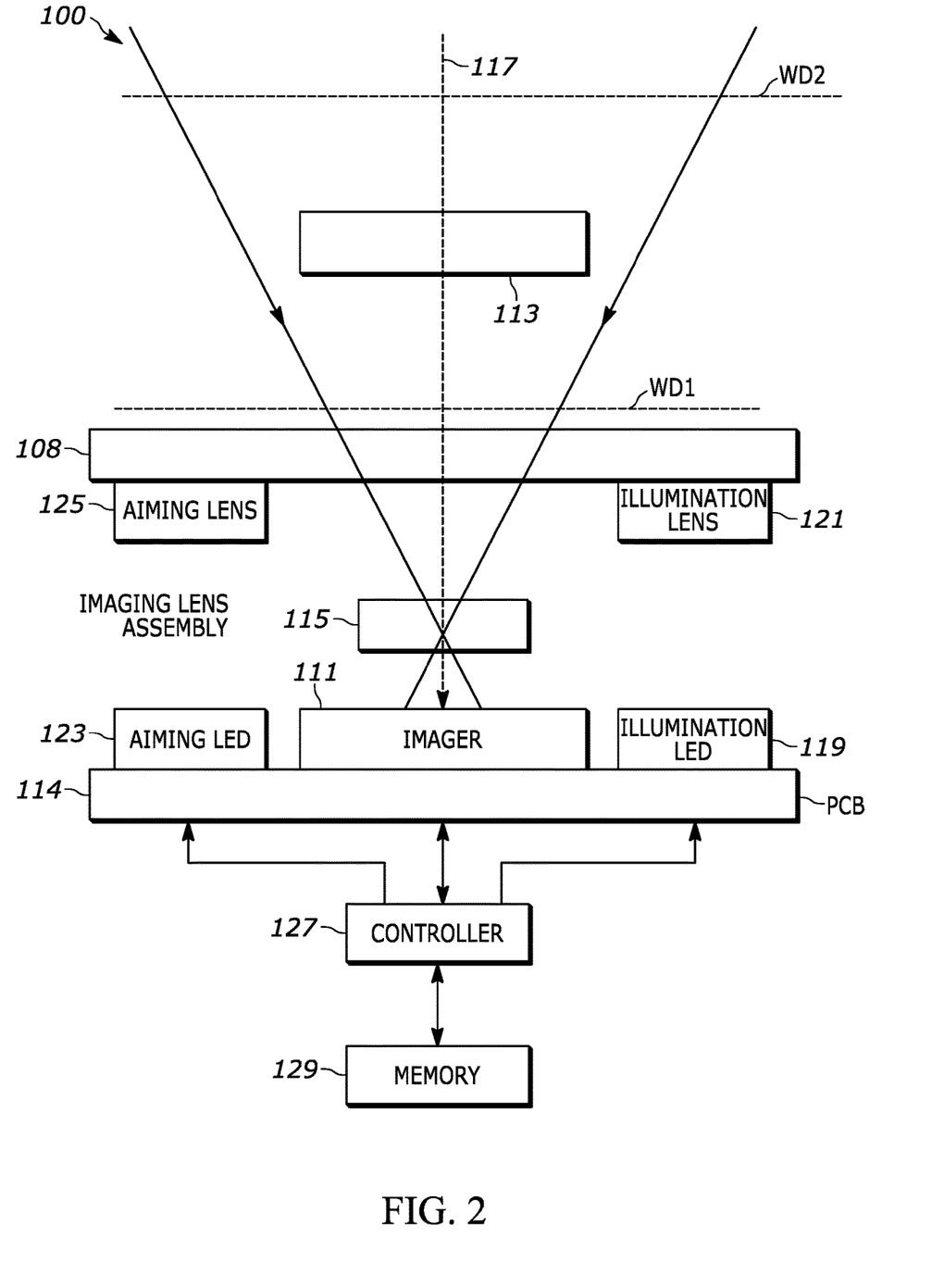
FIG. 2 illustrates a schematic block diagram of various components of the reader of FIG. 1 in accordance an embodiment.

FIGS. 1 and 2 are exemplary embodiments of an optical imaging reader 100 (also referred to as a barcode reader) and the components thereof. However, it will be understood that this disclosure does not apply exclusively to barcode readers 100, and is instead applicable to any device employing an image assembly with a field-of-view (FOV) and an aiming assembly operable to provide illuminated aiming patterns. With more specific reference to barcode readers, it will be further understood that although a particular embodiment of a barcode reader 100 is disclosed, this disclosure is applicable to a variety of barcode readers, including, but not limited to, gun-type handheld readers, mobile computer-type readers, presentation readers, etc. Referring now to the drawings, FIG. 1 illustrates an exemplary barcode reader 100 having a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a reader user (not shown) and includes a trigger 110 for activation by the user. Optionally included in an embodiment is also a base (not shown), also referred to as a base portion, that may be attached to the handle portion 104 opposite the head portion 106, and is configured to stand on a surface and support the housing 102 in a generally upright position. The barcode reader 100 can be used in a hands-free mode as a stationary workstation when it is placed on a countertop or other workstation surface. The barcode reader 100 can also be used in a handheld mode when it is picked up off the countertop or base station, and held in an operator's hand. In the hands-free mode, products can be slid, swiped past, or presented to the window 108 for the reader to initiate barcode reading operations. In the handheld mode, the barcode reader 100 can be moved towards a barcode on a product, and the trigger 110 can be manually depressed to initiate imaging of the barcode.

Other implementations may provide only handheld or only hands-free configurations. In the embodiment of FIG. 1, the reader 100 is ergonomically configured for a user's hand as a gun-shaped housing 102, though other configurations may be utilized as understood by those of ordinary skill in the art. As shown, the lower handle 104 extends below and rearwardly away from the body 102 along a centroidal axis obliquely angled relative to a central FOV axis of a FOV of an imaging assembly within the scanning head 102.

For at least some of the reader embodiments, an imaging assembly includes a light-detecting sensor or imager 111 operatively coupled to, or mounted on, a printed circuit board (PCB) 114 in the reader 100 as shown in FIG. 2. In an embodiment, the imager 111 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 115 over a field of view along an imaging axis 117 through the window 108. The return light is scattered and/or reflected from a target 113 over the field of view. The imaging lens assembly 115 is operative for focusing the return light onto the array of image sensors to enable the target 113 to be read. In particular, the light that impinges on the pixels is sensed and the output of those pixels produce image data that is associated with the environment that appears within the FOV (which can include the target 113). This image data is typically processed by a controller (usually by being sent to a decoder) which identifies and decodes decodable indicia captured in the image data. Once the decode is performed successfully, the reader can signal a successful "read" of the target 113 (e.g., a barcode). The target 113 may be located anywhere in a working range of distances between a close-in working distance (WD1) and a far-out working distance (WD2). In a preferred embodiment, WD1 is about one-half inch from the window 106, and WD2 is about thirty inches from the window 106.

An illuminating light assembly is also mounted in the imaging reader 100. The illuminating light assembly includes an illumination light source, such as at least one light emitting diode (LED) 119 and at least one illumination lens 121, and preferably a plurality of illumination LEDs and illumination lenses, configured to generate a substantially uniform distributed illumination pattern of illumination light on and along the target 113 to be read by image capture. At least part of the scattered and/or reflected return light is derived from the illumination pattern of light on and along the target 113.

Figure 3:
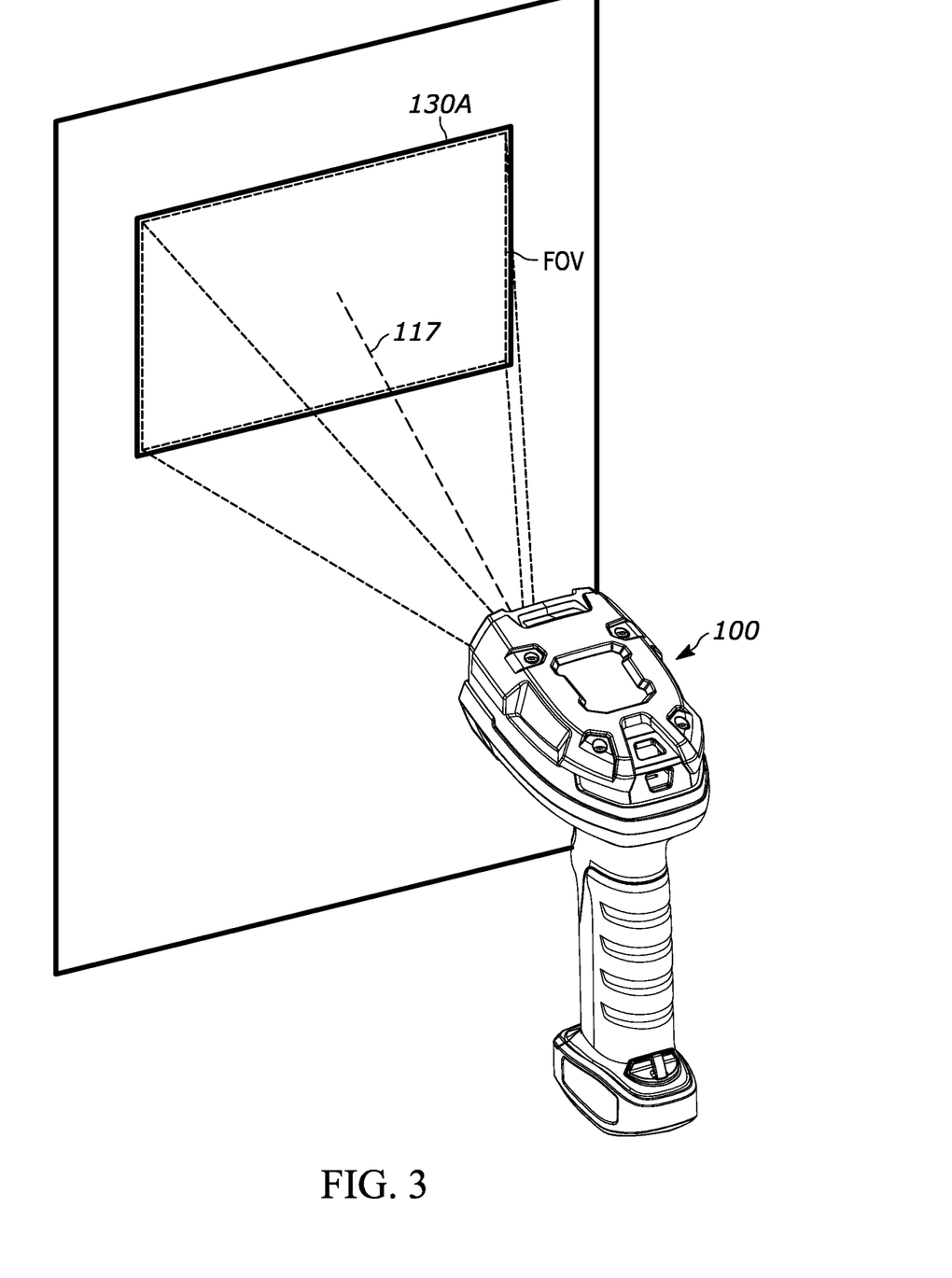
FIGS. 3-6 are perspective rear views of the reader of FIG. 1 and images of aiming patterns projected on an imaging plane in accordance with some embodiments.
Figure 4:
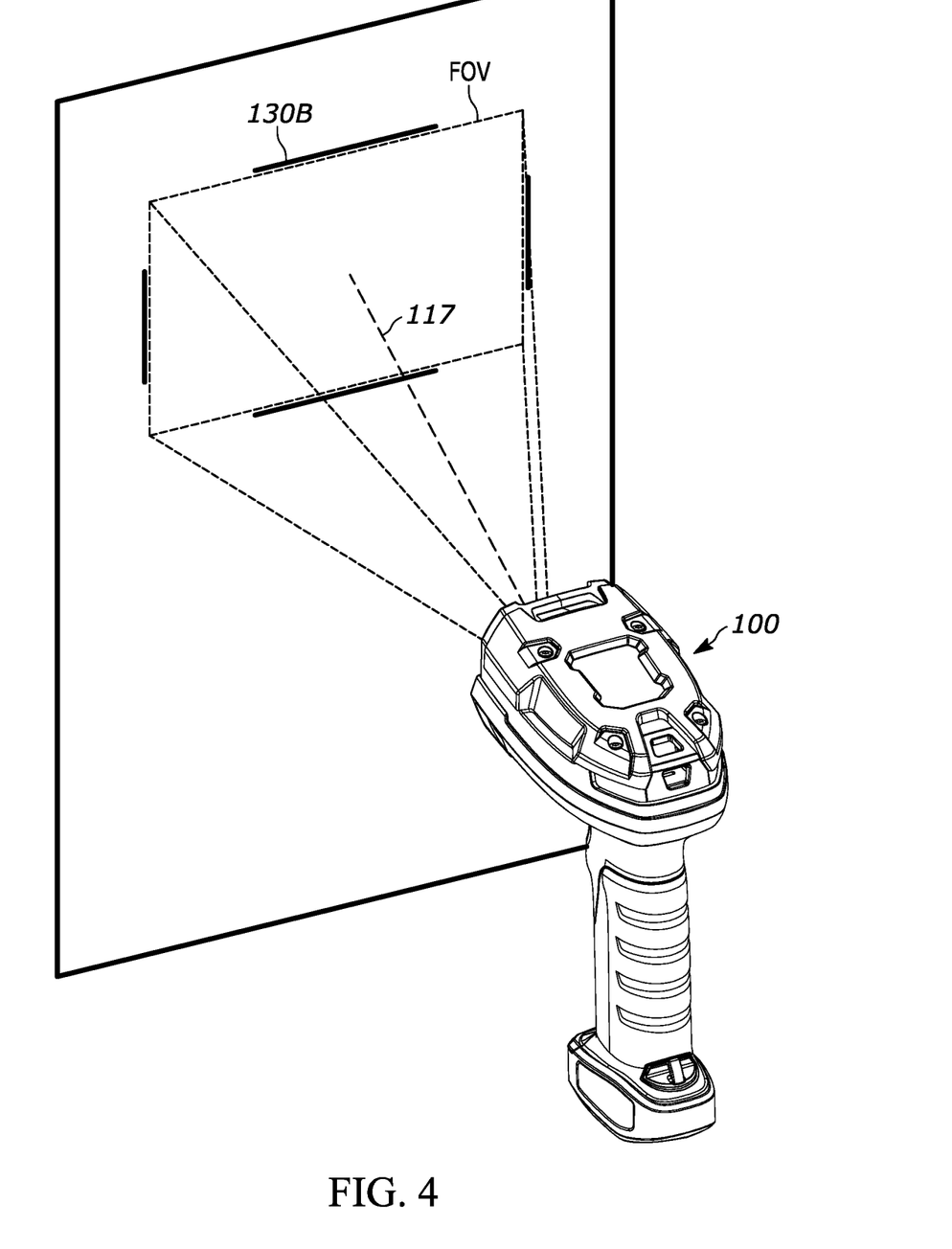
Figure 5:
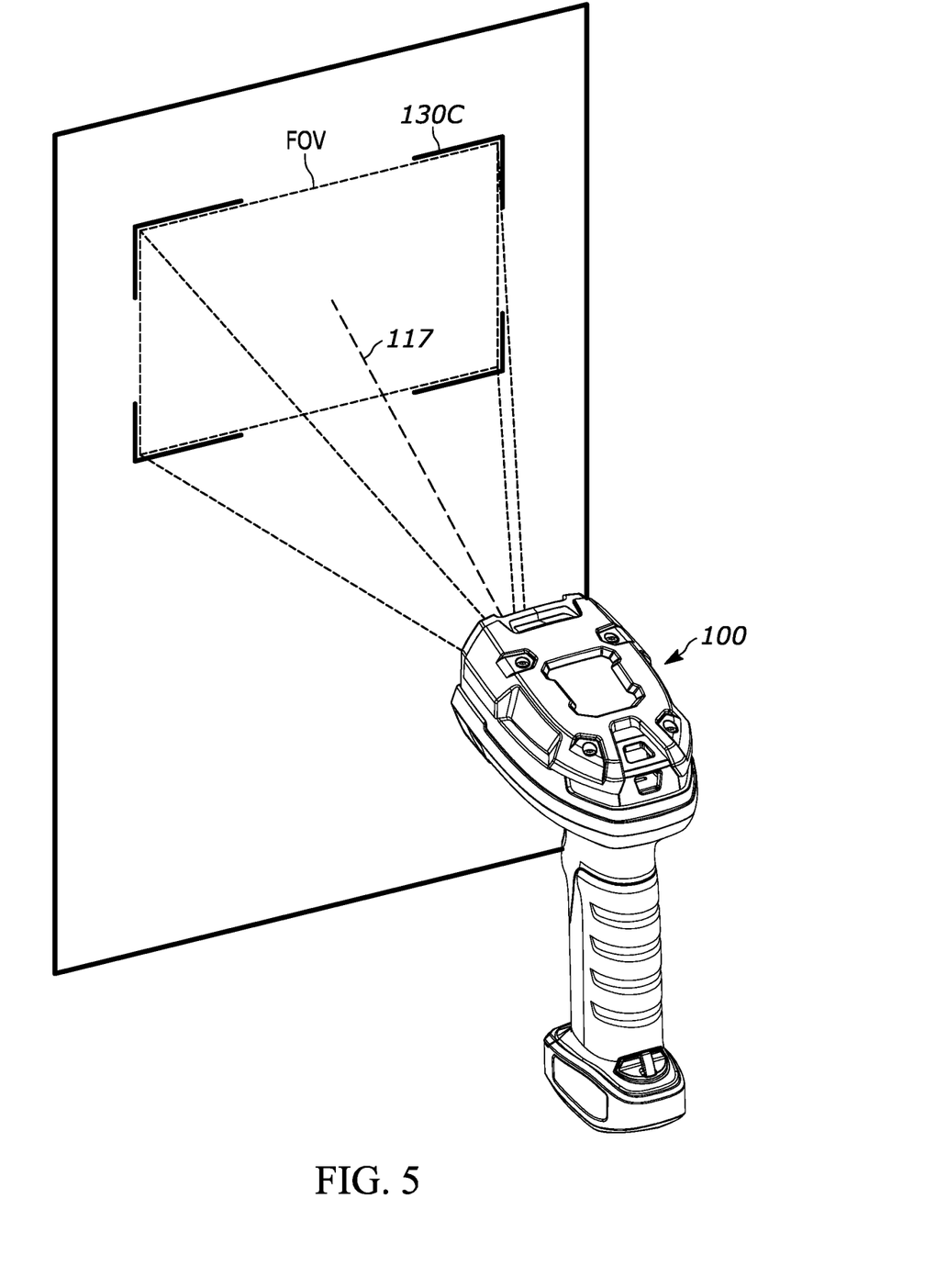
Figure 6:
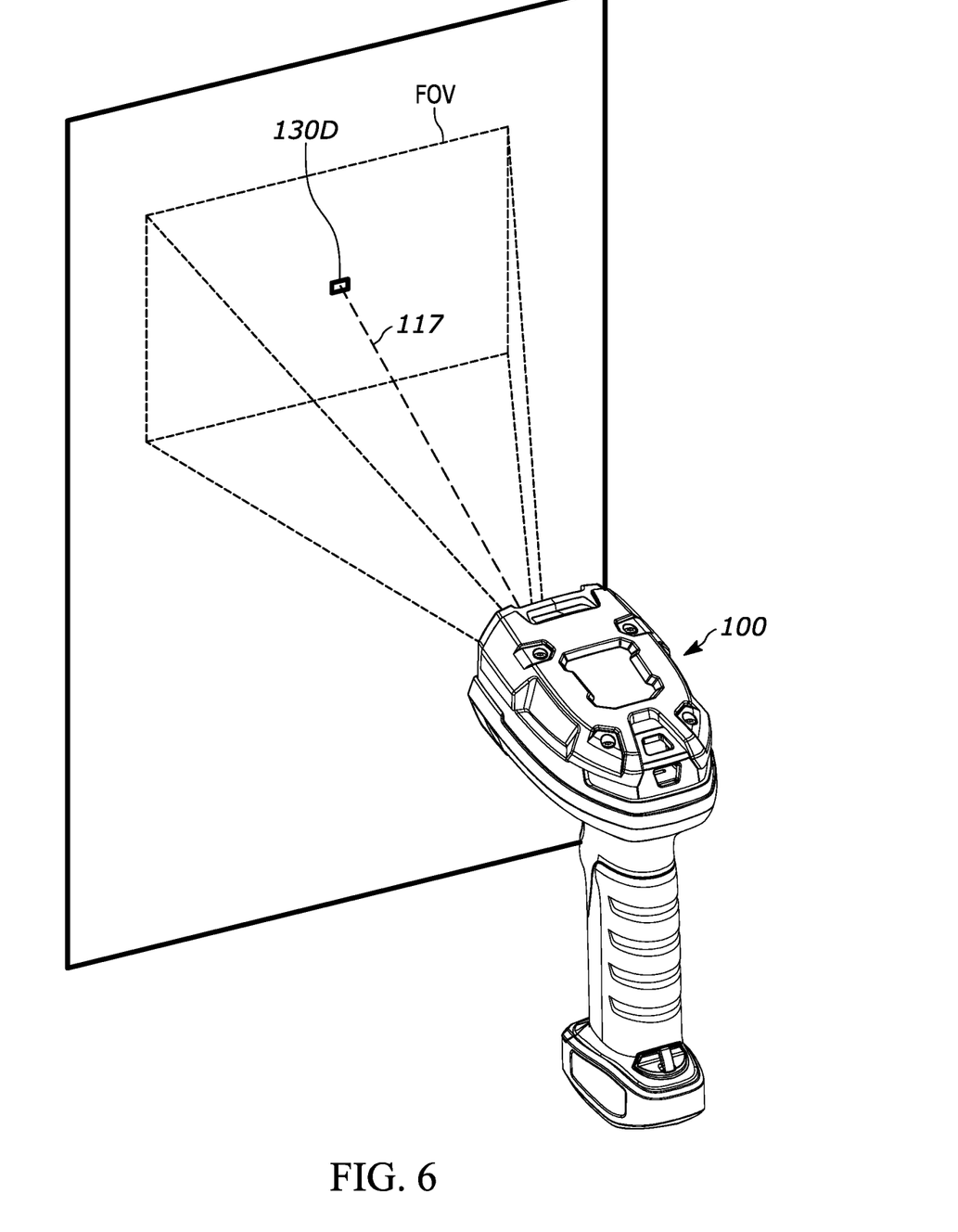

An aiming light assembly is also mounted in the imaging reader 100 and preferably includes an aiming light source 123, e.g., one or more aiming LEDs or laser light sources, and an aiming lens 125 for generating and directing a visible aiming light beam away from the reader 100 onto the target 113 in the direction of the FOV of the imager 111. The aiming light beam has a cross-section with a pattern, examples of which are shown in FIGS. 3-6. Generally, in each of FIGS. 3-6 there is depicted a barcode reader 100, an imaging axis 117, the FOV of the imaging assembly, and an aiming light pattern 130A-130D. In FIG. 3, the aiming light pattern 130A is a complete bounding of the FOV, whereas in FIGS. 4 and 5 the aiming light patterns 130B, 130C are a partial boundings of the FOV. In FIG. 4, the aiming light pattern 130B bounds a portion of the sides of the FOV, and in FIG. 5 the aiming light pattern 130C bounds the corners of the FOV (e.g., the inverse of the aiming light pattern 130B). The partial boundaries of FIGS. 4 and 5 may be achieved using apertures and/or obscurator (i.e., an element that blocks/obscures light from passing) on the window 108. In FIG. 6, the aiming light pattern 130D indicates the center of the FOV, namely the imaging axis 117. In particular, the aiming light pattern 130D bounds or surrounds the imaging axis 117, such that the aiming light is projected parallel to the imaging 117, though not colinear with the imaging axis 117. Although there is shown a notable gap between the FOV and the aiming light patterns 130A-130C in FIGS. 3-5, respectively, it will be understood that this gap is for illustration only to show the FOV boundary and the aiming light patterns 130A-130C indicating the FOV boundary. In practice, however, the aiming light patterns 130A-130C can be coplanar or substantially coplanar with the FOV boundary, such that any distinction between the aiming light pattern and the FOV boundary is practically imperceptible to the human eye and/or such that the aiming light pattern and the FOV boundary are substantially adjacent to each other when projected on an imaging plane. It will further be understood that the cross-sectional patterns depicted in FIGS. 3-6 are not exclusive, and other patterns may be projected onto an imaging plane using the disclosed aim light assembly techniques.

Figure 7:
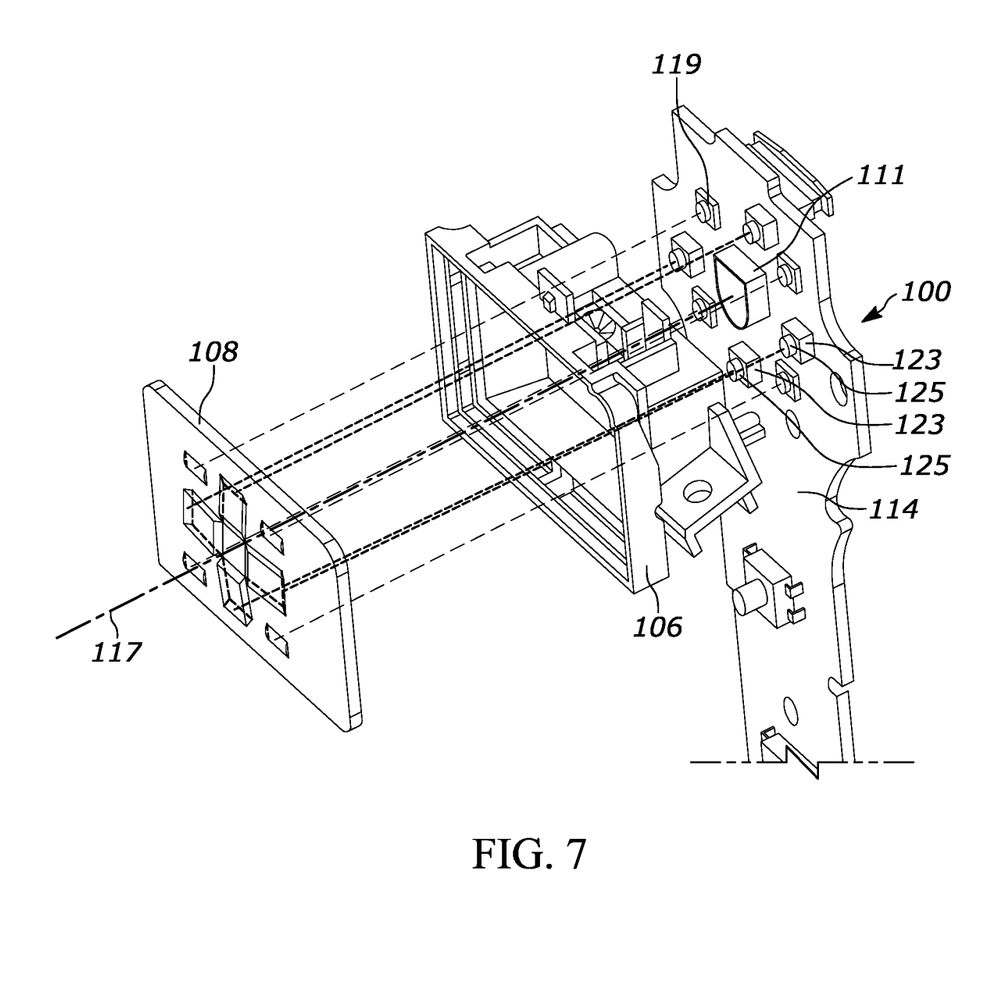
FIG. 7 is a simplified, exploded view of part of the reader of FIG. 1.

Referring again to FIG. 2, the imager 111, the illumination source 119, and the aiming source 123 are operatively connected to a controller or programmed microprocessor 127 operative for controlling the operation of these components. A memory 129 is connected and accessible to the controller 127. Preferably, the microprocessor 127 is the same as the one used for processing the captured return light from the illuminated target 113 to obtain data related to the target 113. The simplified, partial exploded embodiment of the barcode reader 100 in FIG. 7 shows how the aiming sources 123 and illumination sources 119 can be mounted on the same PCB 114 and align with various optical elements (explained further below) in the window 108. In this particular embodiment, the reader 100 is provided with four aiming assemblies arranged in a cross pattern, as well as four illumination assemblies arranged in a square pattern. However, it will be understood that other embodiments may utilize different optical elements, different numbers of aiming assemblies and illumination assemblies, and different placement of aiming assemblies and illumination assemblies. Though not shown, additional optical elements, such as collimators, lenses, apertures, compartment walls, etc. are provided in the head portion 106 of the housing. Although FIGS. 2 and 7 shows the imager 111, the illumination source 119, and the aiming source 123 as being mounted on the same PCB 114, it should be understood that different embodiments of the reader 100 may have these components each on a separate PCB, or in different combinations on separate PCBs. For example, in an embodiment of the reader, the illumination LED source is provided as an off-axis illumination (i.e., has a central illumination axis that is not parallel to the central FOV axis).

Figure 8:
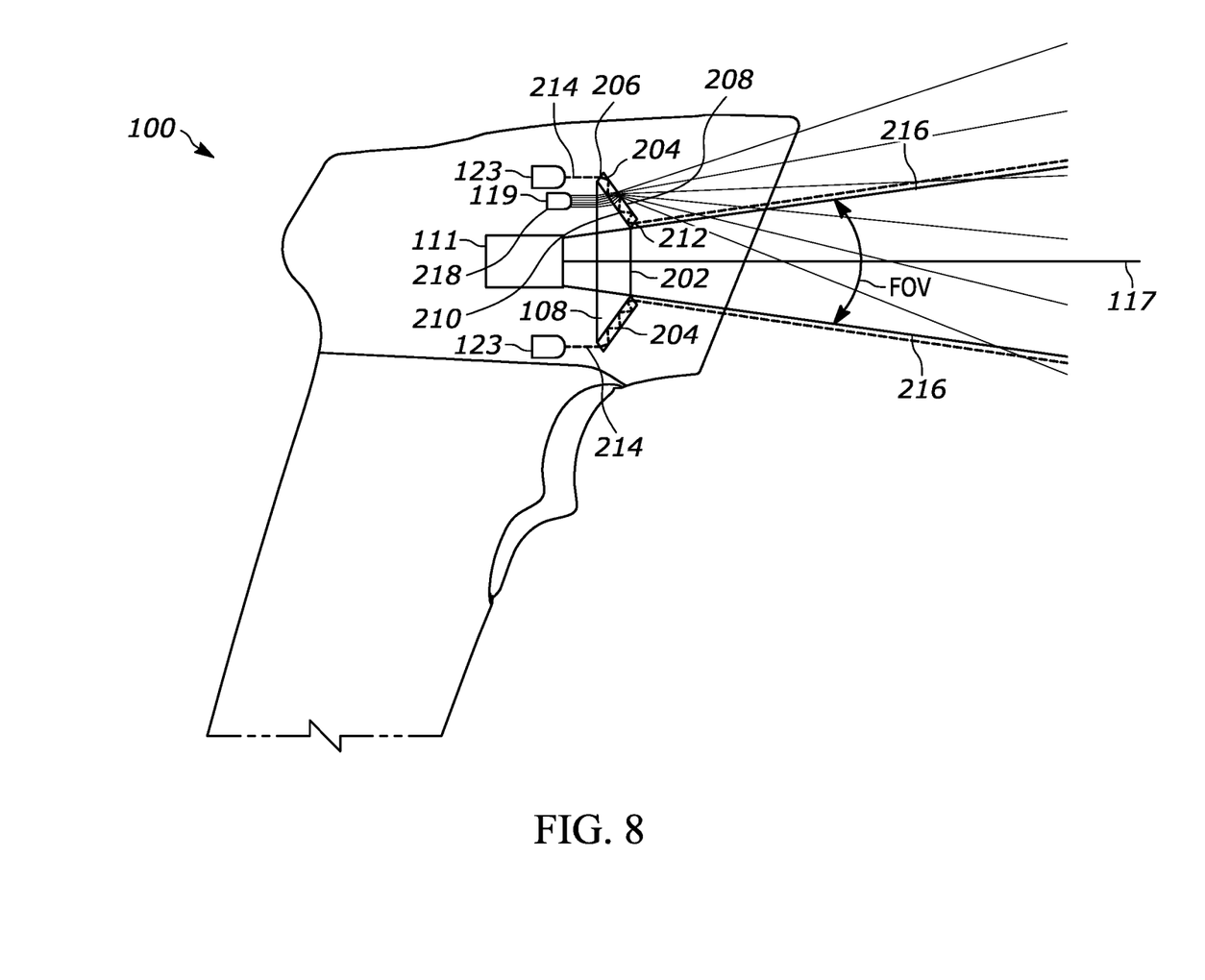
FIG. 8 is a simplified cross-sectional side view of the reader of FIG. 1 showing a window and aiming assembly in accordance with an embodiment.

Referring to FIG. 8, an embodiment of the reader 100 has the window 108 provided as two portions, each having a different refractive index. A first portion 202 of the window 108 is positioned within the path of the imaging assembly FOV, so as to allow an unobstructed path for the FOV. In some embodiments, the refractive index of the first portion 202 can be relatively low. For example, the first portion can be made from crown glass having a refractive index of approximately 1.5. The imager 111 itself is positioned directly behind the first portion 202, though in other embodiments the imager 111 may be provided elsewhere in the housing 102 with one or more optical elements to direct the FOV through the first portion 202. However, with the imager 111 positioned directly behind the first portion 202, the imager 111 may be provided on the same printed circuit board (not shown) and the aiming LED(s) 123, thereby minimizing the amount of space within the housing 102 taken up by internal components of the reader 100 and/or allowing a greater degree of freedom in placing the aiming LED(s) 123.

A second portion 204 of the window 108 has a refractive index different than, and generally greater than, the refractive index of the first portion 202 (e.g., approx. 2.75). In an embodiment, the second portion 202 is provided as a light guide having an entry surface 206, a first surface 208, a second surface 210, and an exit surface 212. The emitted aim light 214 is incident upon the entry surface 206, and the entry surface 206 redirects the majority, and preferably substantially all, of the emitted aiming light impinging the entry surface 206 into the light guide 204. In particular, the entry surface 206 is angled relative to the central axis of the emitted aim light 214, such that substantially all of the aim light 214 impinging the entry surface 206 is directed into the light guide 204 towards the first surface 208 at an angle of incidence greater than the critical angle. The first surface 208 then redirects the aim light 214 to the second surface 210. In an embodiment, the second surface 210 redirects the aim light 214 towards the exit surface 212, such that the light guide 204 internally reflects the aiming light 214 between the first and second surfaces 208, 210 twice before exiting the light guide at the exit surface 212. However, it is understood that the aim light 214 may be internally reflected more than twice before being incident upon the exit surface 212, as shown in FIG. 8.

Thus, the light guide 204 provides total internal reflection of the emitted aim light 214 that enters the light guide 204. It is understood, however, that references to total internal reflection and refraction of light into or out of the light guide are not to be rigidly interpreted as requiring 100% of the light to be reflected or refracted. Those in the relevant field will appreciate that due to manufacturing tolerances and the nature of material surfaces, upon a light beam impinging on a surface and refracting past that surface, a reasonably small amount of light may be reflected off that surface. Likewise, upon a light beam impinging on a surface and reflecting off that surface via, what would be considered total internal reflection, a reasonably small amount of light may be refracted past that surface. As such it is understood that references to the term "total internal reflection" or "internal reflection" refer to a light beam being incident upon surface at an angle greater than the critical angle of the medium, where the critical angle is determined from Snell's Law, and references to the term "refraction" refer to a light beam being incident upon surface at an angle less than the critical angle of the medium, where the critical angle is determined from Snell's Law. Thus, some of the aim light 214 incident upon the entry surface 206 may be reflected away from the light guide 204 rather than being refracted into the light guide 204. Similarly, some of the aim light 214 reflected within the light guide 204 may be transmitted through the first and/or second surfaces 208, 210.

As shown in FIG. 8, the aim light 214 is reflected off the second surface 210 towards the exit surface 212, at which point the aim light 214 exits the light guide 206. In the embodiment of FIG. 8, the angle of the exit surface 212, relative to the first and second surfaces 208, 210 refracts the aim light 214 such that the aim light 214 exits the light guide 204 parallel or substantially parallel to a FOV boundary 216 of the FOV. More particularly, the aim light 214 exits the light guide 206 substantially coplanar with the FOV boundary 216 throughout the working range of the reader 100. Thus, the aim light 214 tracks the FOV of the imaging assembly as the FOV grows with distance from the window 108, such that when the aim light 214 is incident upon the imaging plane, the appearance of the aim light 214 accurately indicates the boundary of the FOV on the imaging plane without or substantially without parallax.

In a further embodiment, the illumination assembly, such as the illumination LED 119 and the illumination lens 121 (not shown in FIGS. 8 and 9), may be positioned behind the optical element 204 relative to the imaging plane, and provide target illumination for the reader 100 through the optical element 204. The illumination light 218 from the illumination source 119 is incident upon the second surface 210, albeit from the opposite direction of the aim light 214, which is then refracted by the optical element 204 and expanded out the first surface 208 to illuminate the target 113. In effect, the optical element may act as an aiming lens for the illumination source. In another embodiment, the illumination source 119 along with the illumination lens 121 can be laterally shifted (see FIG. 11) relative to the aim light source 123 such that the illumination lens is positioned in a region that doesn't overlap with the optical element 204. This way, the illumination lens can be configured to direct the illumination light over a desired range without the influence of the optical element 204.

Figure 9:
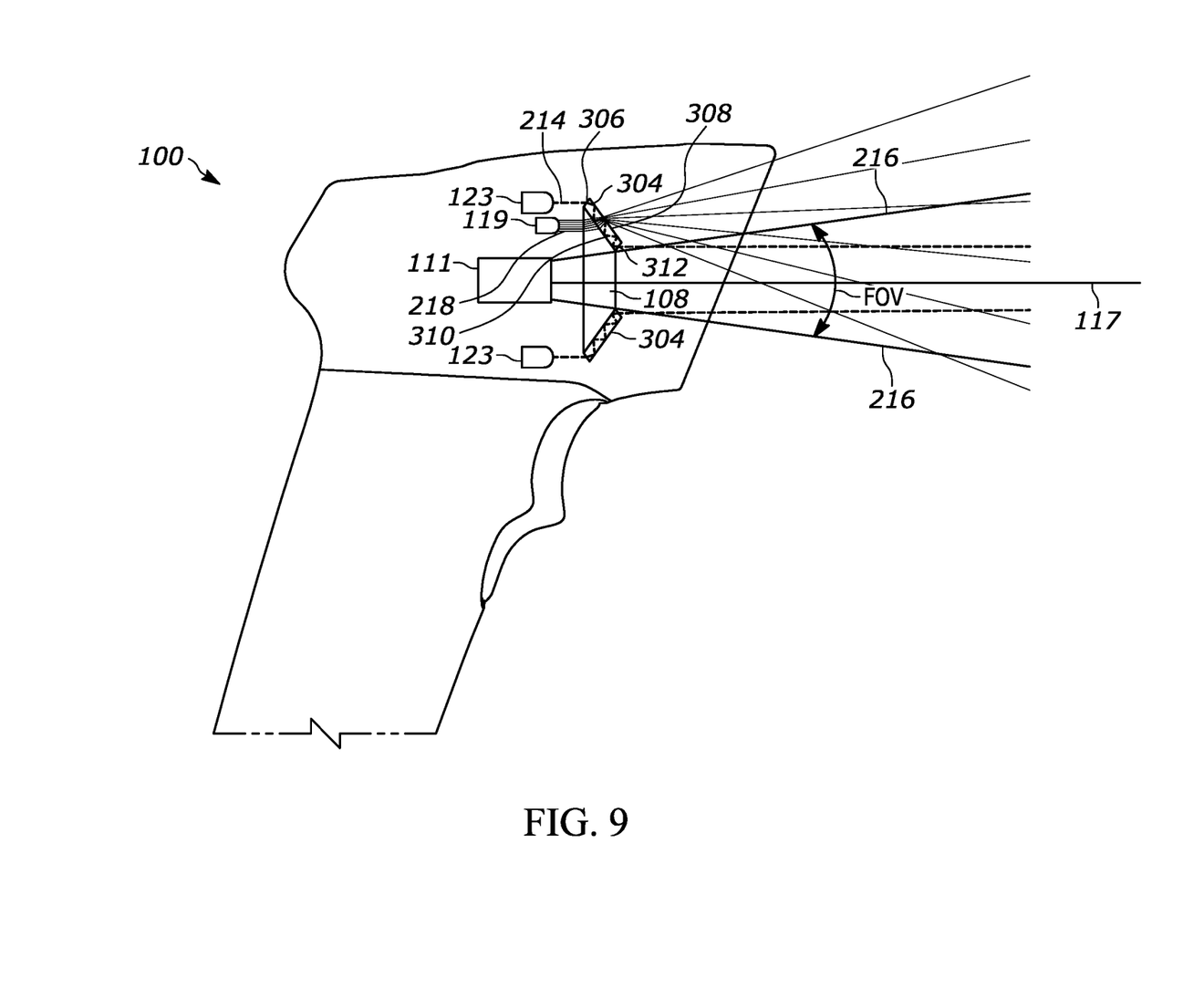
FIG. 9 is a simplified cross-sectional side view of the reader of FIG. 1 showing a window and aiming assembly in accordance with another embodiment.

FIG. 9 depicts an alternative embodiment of the reader 100, the elements of the reader 100 being generally the same as those of the embodiment FIG. 8, with differences in the optical element 206. Again, the window 108 has two portions, each having a different refractive index. A first portion 302 of the window 108 is positioned within the path of the imaging assembly FOV, so as to allow an unobstructed path for the FOV of the imaging assembly, with the imager 111 positioned directly behind the first portion 302.

In the embodiment of FIG. 9, an optical element 304, which again may be a light guide, has a refractive index greater than the refractive index of the first portion 302 (e.g., approx. 2.75), and has an entry surface 306, a first surface 308, a second surface 310, and an exit surface 312. The emitted aim light 214 is incident upon the entry surface 306, and the entry surface 306 redirects the majority, and preferably substantially all, of the impinging aiming light into the light guide 304. Again, the illumination source 119 may be positioned behind the optical element 304 relative to the imaging plane, which, in turn, refracts and expands the illumination light so as illuminate the target 113 for the reader 100, or the illumination source 119 may be laterally shifted to avoid the optical element 304.

As shown in FIG. 9, the aim light 214 is refracted by the entry surface 306 and incident upon the first surface 308 at an angle greater than the critical angle as determined from Snell's Law, so as to create total internal reflection of the aim light 214 within the light guide 304, as described above. The first surface 308 then redirects the aim light 214 to the second surface 310. In an embodiment, the second surface 310 redirects the aim light 214 towards the exit surface 312, such that the light guide 304 internally reflects the aiming light 214 between the first and second surfaces 308, 310 twice before exiting the light guide at the exit surface 312. However, it is understood that the aim light 214 may be internally reflected more than twice before being incident upon the exit surface 312, as shown in FIG. 9.

At this point the aim light 214 exits the light guide 306. In the embodiment of FIG. 9, the angle of the exit surface 312 relative to the first and second surfaces 308, 310 refracts the aim light 214 such that the aim light 214 exits the light guide 304 parallel to the central FOV axis 117 of the imager 111. Thus, rather than tracking the FOV of the imaging assembly, the aim light 214 tracks the central FOV axis of the imaging assembly, even as the FOV grows with distance from the window 108, such that when the aim light 214 is incident upon the imaging plane, the appearance of the aim light 214 accurately indicates the approximate center of the FOV (e.g., the imaging axis 117). However, it will be understood that the angle of the exit surface 312 does not have to be the only angle that is varied to achieve the desired directionality of the aim pattern. That is, the angles of any one or more of the surfaces 306, 308, 310, 312 may be varied to affect how the aiming light 214 exits the light guide ultimately travels down range. It will be further understood that this is the case not just for the currently described embodiment, but for any embodiment falling within the scope of the present disclosure.

As seen in both FIGS. 8 and 9, the entry surface 206, 306 is angled relative to the central aim axis or the direction of a collimated beam of the aiming light and relative to the first surface 208, 308 so as to achieve a refraction of a majority, and preferably a substantial totality, of the aiming light impinging thereon into the optical element 204, 304 and total internal reflection of the aim light 214 within the optical element 204, 304. Similarly, the first surface 208, 308 is angled (and in some embodiments is parallel) relative to the second surface 210, 310, so as to reflect and guide, via total internal reflection, the aim light 214 towards the exit surface 212, 312. In these embodiments, the first surface 208, 308 and the second surface 210, 310 are angled at approximately 116.5 degrees (+/−0.5 degrees) relative to the central FOV axis. In turn, the exit surface 212, 312 is angled relative to the central FOV axis so as to refract and direct the aim light 214 at a desired angle relative to the central FOV axis. The angle of the exit surface in the embodiments of FIGS. 8 and 9 is approximately 68 degrees (+/−0.5 degrees) relative to the central FOV axis. Of course, it will be understood that the particular angles are dependent upon the refractive indices of the light guide 204, 304 and any medium (including air) that abuts any surface of the light guide where the aim light impinges thereon. Thus, the specific angles of the surfaces of the light guide 204, 304 can depend on the refractive index of the light guide 204, 304 and/or the difference in refractive index between the light guide 204, 304 and the medium incident upon the entry surface 206, 306 (e.g., air, a second light guide to guide the aim light 214 to the entry surface 206, 306 and/or the window 108). Additionally, reflective material, such as reflective coatings, may be used on any of the surfaces 206-212, 306-312.

Referring to the specific embodiments of FIGS. 8 and 9, in the embodiment of FIG. 8 the angle of the entry surface 206 is approximately 64 degrees (+/−0.5 degrees), whereas in the embodiment of FIG. 9 the angle of the entry surface 306 is approximately 49 degrees (+/−0.5 degrees). This difference in angle changes how the aim light 214 is refracted into the light guide, which, in turn, changes how the aim light 214 is refracted by the exit surface 206, 306. In particular, the angle of the entry surface 206 of the light guide 204 relative to the central aiming axis in FIG. 8 is such that the aim light 214 is reflected within the waveguide 204 so as to be refracted by the exit surface 212 at an angle parallel to the FOV boundary of the imaging assembly. On the other hand, the angle of the entry surface 306 of the light guide 304 relative to the central aiming axis in FIG. 9 is such that the aim light 214 is reflected parallel to the central FOV axis of the imaging assembly.

Figure 10:
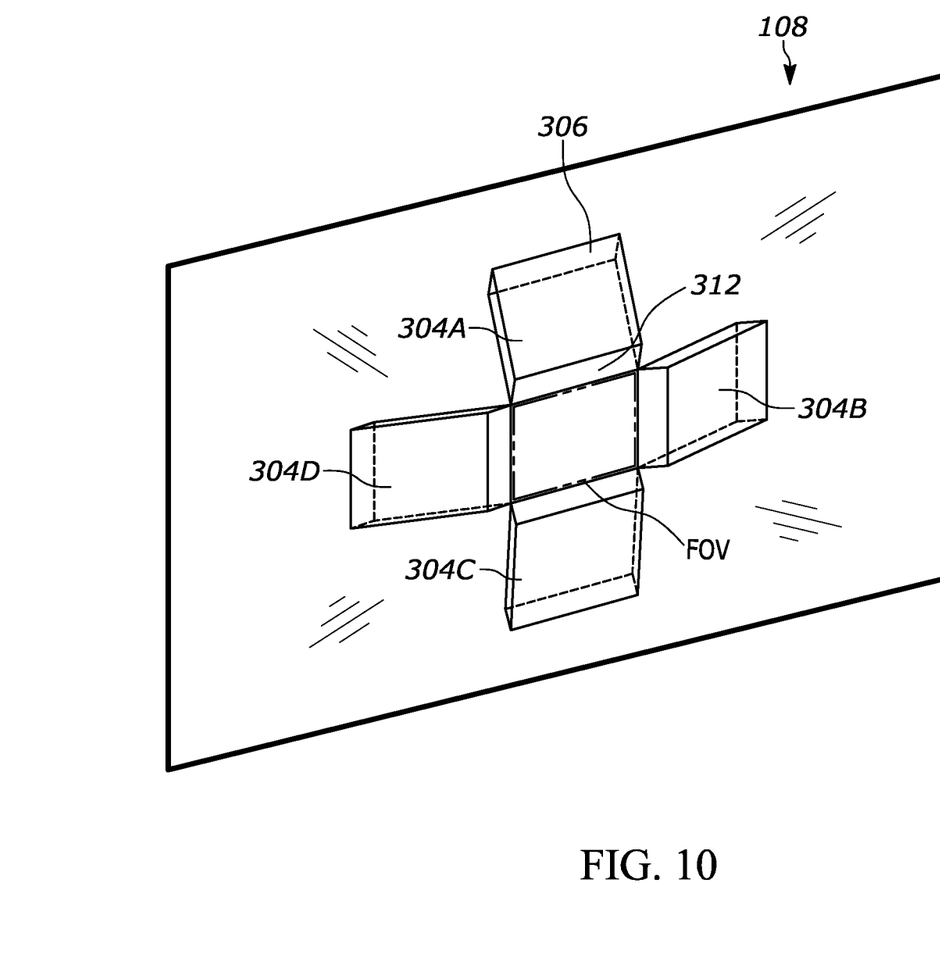
FIGS. 10-12 are perspective and simplified front views of a window and light guide in accordance with some embodiments.
Figure 11:
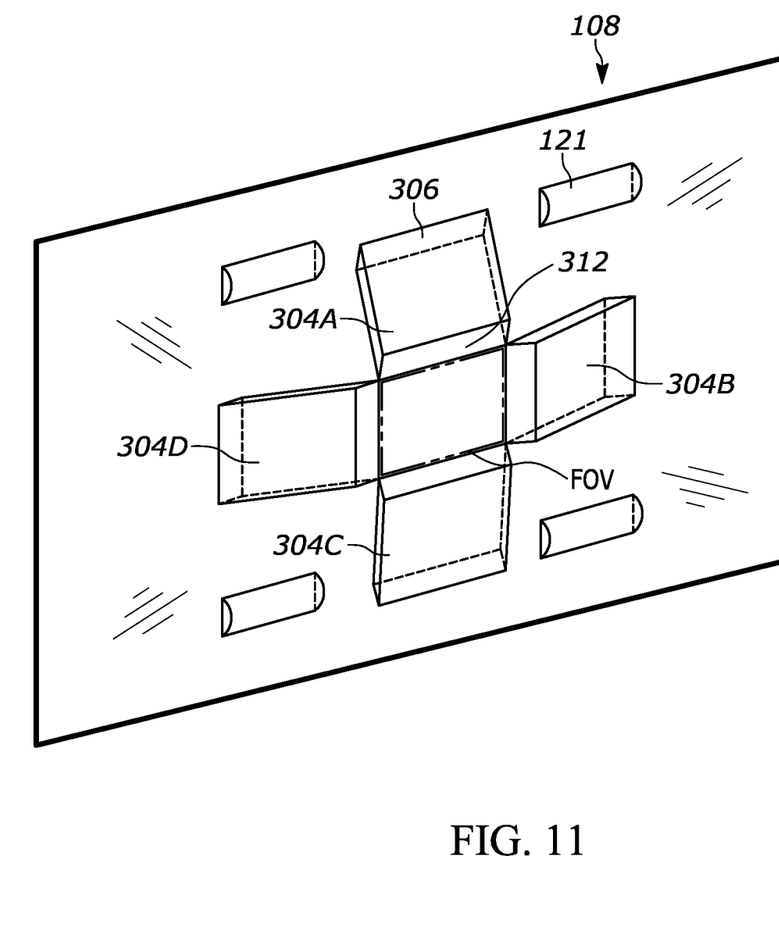
Figure 12:
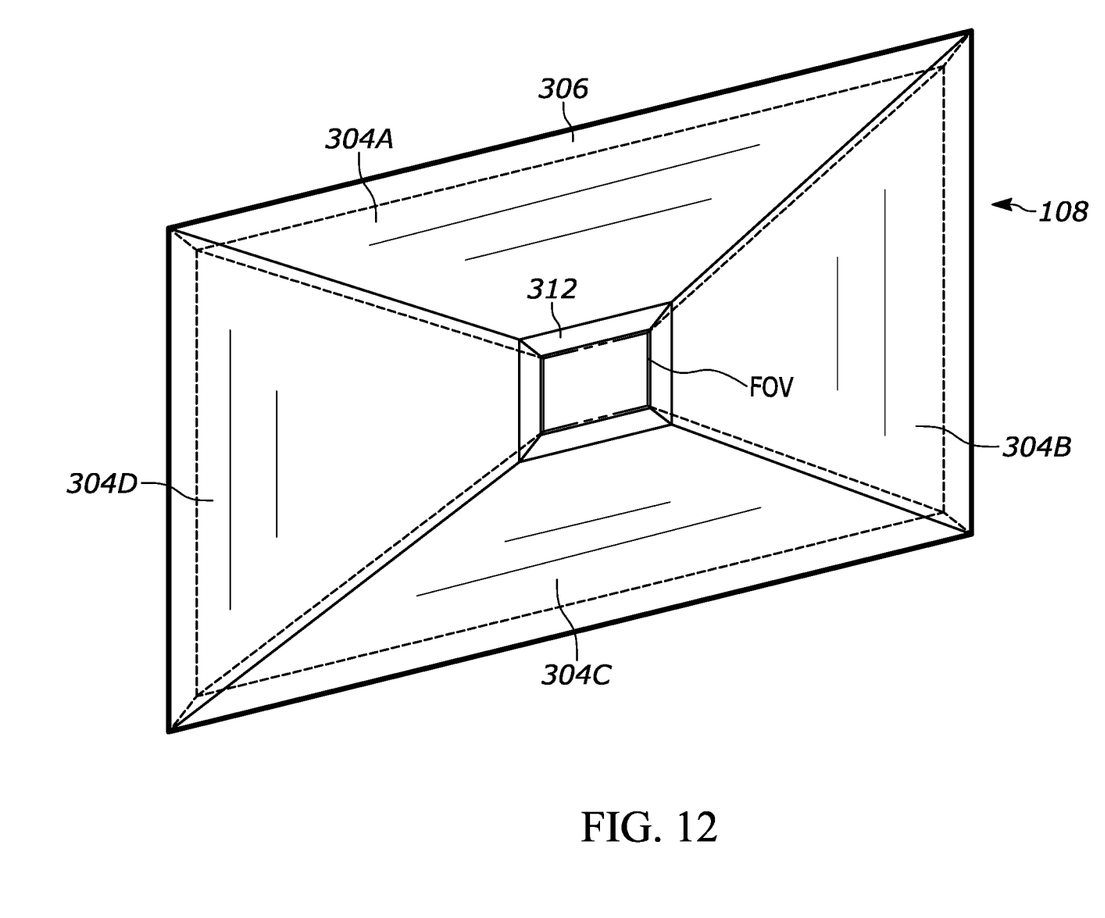

In either embodiment, the aim light 214 may be manipulated further based on the curvature of the entry surface 206, 306, the first surface 208, 308, the second surface 210, 310, and/or the exit surface 212, 312. For example, using the embodiment of FIG. 9 and referring to FIGS. 10, 11 and 12, the light guide 304 is shown to have multiple sections or sub-elements 304A-304D. With respect to the sub-element 304A, the aim source can generally be a dot source for the aim light 214. As such, in order to broaden or widen the aim light 214, the entry surface 306 of sub-element 304A is concave such that the aim light 214 is widened laterally between incidence upon the entry surface 306 and upon incidence on the exit surface 312. The exit surface 312, in turn, is also concave so as to collimate the aim light 214 longitudinally, thereby creating a beam of light that remains parallel to, though not colinear with, the imaging axis 117 even as the FOV boundary widens with working distance. The effect of the collimated beam is that it creates an image of a line on the imaging plane that can act as a reference for the central imaging axis 117. The entry and exit surfaces of the other sub-elements 3046-304D may be similarly curved so as to form a small box indicating the center of the FOV of the imaging assembly. In another example, using the embodiment of FIG. 8, the aim source can generally be a dot source for the aim light 214. As such, in order to broaden or widen the aim light 214, the entry surface 206 of light guide 204 is concave such that the aim light 214 is widened laterally between incidence upon the entry surface 206 and upon incidence on the exit surface 212. The exit surface 212, in turn, is also concave so as to narrow the aim light 214 longitudinally, thereby creating a beam of light that widens laterally with the adjacent FOV boundary as both the aim light and the FOV extend away from the reader. The effect of the narrowed beam is that it creates an image of a line on the imaging plane that can act as a reference for the adjacent boundary of the FOV. The entry and exit surfaces of the other light guides may be similarly curved so as to form, e.g., a box indicating the boundaries of the FOV of the imaging assembly. Alternatively, the entry surface 206, 306 and exit surface 212, 312 of each sub-element may be convex so as to vary the aim pattern as desired. As such, it will be understood that the curvature of the entry surface 206, 306 and exit surface 212, 312 may affect how the aim light 214 is manipulated and the image that is generated on the imaging plane. With particular reference to FIG. 11, an embodiment of the optical element 304 and window 108 may further include incorporating the illumination lens 121 in the window 108 for each of a plurality of illumination sources so as to deliver the illumination light onto the imaging plane and illuminate the target 113. In either the case of the aiming source and/or the illumination source, a single source may be provided in combination with a light pipe extending from the source to optical sub-element or lens, such that the light source directs the light into the light pipe in order to direct the light to the light guide 204, 304 and/or illumination lens 121.

It will be appreciated that at least some embodiments of the present invention can lead to advantageous designs which allow aim light patterns to be emitted in a manner that is adjacent to FOV boundaries and avoid the effects of parallax as the aim light pattern extends away from the imaging assembly. Using the techniques described herein, the aforementioned emission of light can be achieved regardless of the proximity of the aim light source to the imager. For practical purposes, this can allow for easier design of imaging assemblies such that the aiming sources do not need to be positioned in extremely close proximity to the imaging sensor, especially since circuit board space near and/or around the imager may be occupied by various circuit traces, preventing the positioning of the aim light sources in the desired locations.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An apparatus comprising:
   a housing having a cavity, a window and an optical element;
   an imaging assembly disposed within the cavity and having a working range, the imaging assembly having an imager with a field-of-view (FOV) defined by imaging lens assembly and extending through the window, the FOV having a central FOV axis and a boundary FOV axis non-parallel relative to the central FOV axis, the imager configured to capture at least one of: light reflected from a target and light emitted from the target;
   an illumination assembly positioned within the housing and having an illumination light source configured to illuminate the target for image capture, and
   an aiming assembly disposed within the cavity, the aiming assembly configured to provide, via an aiming light source, an aiming light through the optical element, the optical element configured to direct the aiming light parallel to the boundary FOV axis, such that the aiming light projects an image on the target that indicates the boundary of the FOV throughout the working range,
   wherein the illumination light source is different from the aiming light source, and wherein the optical element of the aiming assembly is separate from the imaging lens assembly.

2. The apparatus of claim 1, wherein the optical element comprises a light guide having a first surface, a second surface, an entry surface and an exit surface, wherein the light guide is configured to receive aiming light from the aiming assembly at the entry surface and direct the aiming light parallel to the boundary FOV axis at the exit surface.

3. The apparatus of claim 2, wherein:
the entry surface is configured to direct the aiming light to the first surface,
the first surface is configured to reflect the aiming light to the second surface, and
the second surface is configured to reflect the aiming light to the exit surface.

4. The apparatus of claim 2, wherein the light guide is configured to reflect the aiming light between the first and second surfaces at least twice before exiting the light guide at the exit surface.

5. The apparatus of claim 2, wherein at least one of the entry surface and the exit surface is at least one of a concave surface pattern and a convex surface pattern.

6. The apparatus of claim 2, wherein at least one of the entry surface and the exit surface is a flat surface pattern.

7. The apparatus of claim 1, wherein:
the window comprises a first portion and a second portion, and
the FOV extends through the first portion and the second portion comprises the optical element.

8. The apparatus of claim 7, wherein the first portion comprises an interior area of the window, and the second portion comprises an area of the window peripheral to the interior area of the window.

9. The apparatus of claim 7, wherein:
the second portion comprises a plurality of regions,
the optical element comprises a plurality of optical sub-elements each corresponding to one of the plurality of regions.

10. The apparatus of claim 9, wherein the aiming assembly comprises a plurality of aiming light sources each corresponding to one of the plurality of optical sub-elements.

11. The apparatus of claim 9, wherein:
the optical element comprises a light pipe extending to at least two of the plurality of sub-elements, and
the aiming light assembly is configured to direct the aiming light into the light pipe.

12. The apparatus of claim 1, wherein the illumination assembly is configured to emit light through the optical element onto the target to illuminate the target for the image capture.

13. An apparatus comprising:
a housing having a cavity, a window and an optical element;
an imaging assembly disposed within the cavity, the imaging assembly having an imager with a field-of-view (FOV) extending through the window, the FOV having a central FOV axis and a boundary FOV axis non-parallel relative to the central FOV axis, the imager configured to capture at least one of: light reflected from a target and light emitted from the target; and
an aiming assembly disposed within the cavity, the aiming assembly configured to provide an aiming light through the optical element, the aiming light having a central aiming axis, wherein the optical element is configured to reposition the central aiming axis from a central source axis of a source of the aiming light to a central exit axis of an exit of the optical element, the central source axis being non-coaxial with the central exit axis,
wherein the optical element comprises a light guide having a first surface, a second surface, an entry surface, and an exit surface, and
wherein:
the light guide is configured to receive aiming light from the aiming assembly at the entry surface,
the entry surface is configured to direct the aiming light toward the first surface;
the first surface is configured to reflect the aiming light toward the second surface;
the second surface is configured to reflect the aiming light toward the exit surface; and
the exit surface is configured to refract the aiming light out from the light guide.

14. The apparatus of claim 13, wherein the light guide is configured to direct the aiming light parallel to the central FOV axis at the exit surface.

15. The apparatus of claim 13, wherein the light guide is configured to direct the aiming light parallel to the boundary FOV axis at the exit surface.

16. The apparatus of claim 13, wherein the light guide is configured to reflect the aiming light between the first and second surfaces at least twice before exiting the light guide at the exit surface.

17. The apparatus of claim 13, wherein at least one of the entry surface and the exit surface is at least one of a concave surface pattern and a convex surface pattern.

18. The apparatus of claim 13, wherein at least one of the entry surface and the exit surface is a flat surface pattern.

19. The apparatus of claim 13, wherein:
the window comprises a first portion and a second portion, and
the FOV extends through the first portion and the second portion comprises the optical element.

20. The apparatus of claim 19, wherein the first portion comprises an interior area of the window, and the second portion comprises an area of the window peripheral to the interior area of the window.

21. The apparatus of claim 20, wherein:
the second portion comprises a plurality of regions,
the optical element comprises a plurality of optical sub-elements each corresponding to one of the plurality of regions.

22. The apparatus of claim 21, wherein the aiming assembly comprises a plurality of aiming light sources each corresponding to one of the plurality of optical sub-elements.

23. The apparatus of claim 21, wherein:
the optical element comprises a light pipe extending to at least two of the plurality of sub-elements, and
the aiming light assembly is configured to direct the aiming light into the light pipe.

24. The apparatus of claim 21, further comprising an illumination assembly positioned within the housing and configured to emit light through the optical element onto the target to illuminate the target for image capture.

* * * * *